United States Patent
Narayanaswamy et al.

(10) Patent No.: US 9,903,248 B2
(45) Date of Patent: Feb. 27, 2018

(54) METHOD AND APPARATUS FOR EXHAUST PURIFICATION FOR AN INTERNAL COMBUSTION ENGINE

(71) Applicant: GM GLOBAL TECHNOLOGY OPERATIONS LLC, Detroit, MI (US)

(72) Inventors: Kushal Narayanaswamy, Troy, MI (US); Cherian A. Idicheria, Novi, MI (US); Paul M. Najt, Bloomfield Hills, MI (US); Gerald A. Szekely, Jr., Sterling Heights, MI (US); Joel G. Toner, Bad Axe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/097,417

(22) Filed: Apr. 13, 2016

(65) Prior Publication Data
US 2017/0298799 A1    Oct. 19, 2017

(51) Int. Cl.
*F01N 3/00* (2006.01)
*F01N 3/28* (2006.01)
*F01N 3/20* (2006.01)

(52) U.S. Cl.
CPC ............. *F01N 3/2882* (2013.01); *F01N 3/20* (2013.01); *F01N 2240/28* (2013.01)

(58) Field of Classification Search
USPC ......... 60/274, 275, 286, 295, 297, 301, 303, 60/311; 422/186.03, 186.04, 186.07, 422/186.21, 186.22
See application file for complete search history.

(56) References Cited

U.S. PATENT DOCUMENTS

| | | | | |
|---|---|---|---|---|
| 6,212,883 | B1 * | 4/2001 | Kang | F01N 3/0892 |
| | | | | 204/176 |
| 6,363,716 | B1 * | 4/2002 | Balko | B01D 53/9431 |
| | | | | 422/183 |
| 6,772,584 | B2 * | 8/2004 | Chun | B01D 53/9431 |
| | | | | 422/186.01 |
| 7,299,624 | B2 * | 11/2007 | Hirata | F01N 3/206 |
| | | | | 60/274 |
| 2004/0093853 | A1 * | 5/2004 | Hemingway | B01D 53/32 |
| | | | | 60/275 |
| 2006/0288689 | A1 * | 12/2006 | Shimoda | F01N 3/033 |
| | | | | 60/275 |

* cited by examiner

*Primary Examiner* — Binh Q Tran
(74) *Attorney, Agent, or Firm* — Quinn IP Law

(57) ABSTRACT

An exhaust aftertreatment system for purifying an exhaust gas feedstream that is expelled from an internal combustion engine that is operable at an air/fuel ratio that is lean of stoichiometry is described. The exhaust aftertreatment system includes a barrier discharge plasma reactor that is disposed upstream relative to a catalytic reactor and electrically connected to a plasma controller. The barrier discharge plasma reactor is controlled to generate ozone from constituents of the exhaust gas feedstream when the internal combustion engine is operating at a lean air/fuel ratio and at a low temperature condition. The generated ozone reacts, in the catalytic reactor, to oxidize non-methane hydrocarbons contained in the exhaust gas feedstream when the internal combustion engine is operating at lean air/fuel ratio and at low temperature conditions.

19 Claims, 2 Drawing Sheets

METHOD AND APPARATUS FOR EXHAUST PURIFICATION FOR AN INTERNAL COMBUSTION ENGINE

TECHNICAL FIELD

This disclosure relates to exhaust purification methods and apparatuses for an internal combustion engine, and control related thereto.

BACKGROUND

Internal combustion engines introduce an air/fuel mixture into each cylinder that is compressed during a compression stroke and ignited by either the compression (compression-ignition) or by a spark plug (spark-ignition). Spark-ignition (SI) engines may operate in different combustion modes, including, by way of non-limiting examples, a homogeneous SI combustion mode and a stratified-charge SI combustion mode. SI engines may also be configured to operate in a homogeneous-charge compression-ignition (HCCI) combustion mode, also referred to as controlled auto-ignition combustion.

An engine in-cylinder air/fuel mixture may be characterized in terms of an air/fuel ratio, which may be described as stoichiometric, lean, or rich. Compression-ignition engines and spark-ignition engines may be configured to operate at lean air/fuel ratio conditions. Engine exhaust gases associated with lean air/fuel ratio operation may have relatively higher quantities of nitrogen oxides, including, e.g., nitric oxide (NO) and nitrogen dioxide (NO2), as compared to an internal combustion engine operating at stoichiometry.

SUMMARY

An exhaust aftertreatment system for purifying an exhaust gas feedstream that is expelled from an internal combustion engine that is operable at an air/fuel ratio that is lean of stoichiometry is described. The exhaust aftertreatment system includes a barrier discharge plasma reactor that is disposed upstream relative to a catalytic reactor and electrically connected to a plasma controller. The barrier discharge plasma reactor is controlled to generate ozone from constituents of the exhaust gas feedstream when the internal combustion engine is operating at a lean air/fuel ratio and at a low temperature condition. The generated ozone reacts, in the catalytic reactor, to oxidize non-methane hydrocarbons contained in the exhaust gas feedstream when the internal combustion engine is operating at lean air/fuel ratio and at low temperature conditions.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
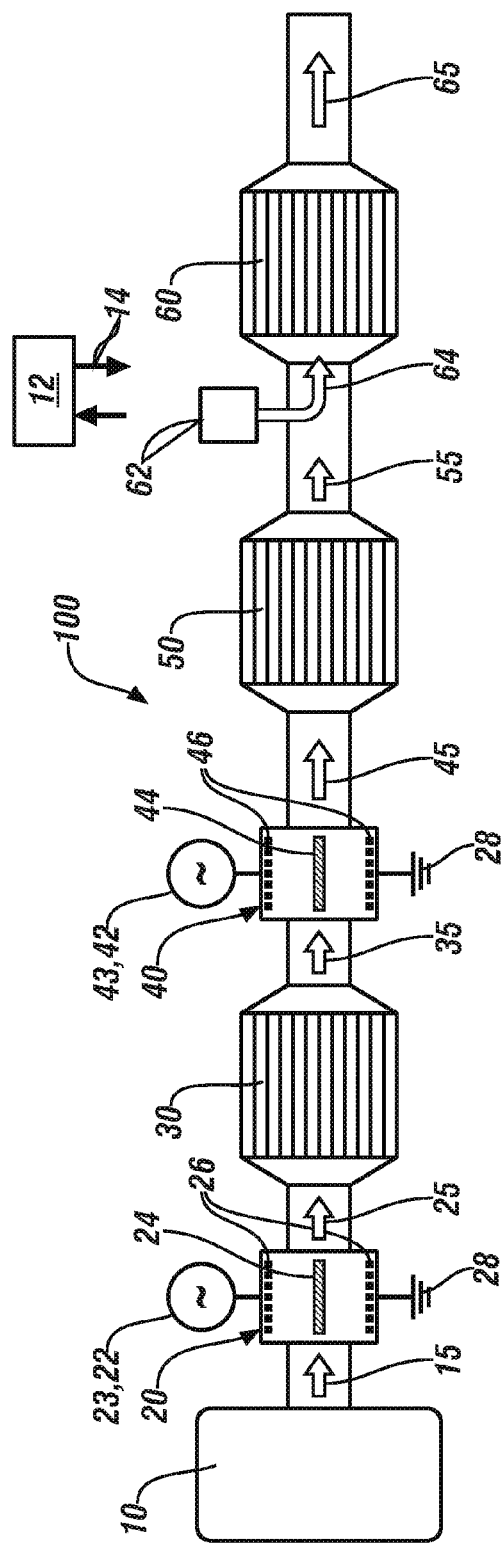
FIG. 1 schematically illustrates an embodiment of an internal combustion engine and exhaust aftertreatment system that includes a plasma reactor disposed upstream to a catalytic reactor, wherein the plasma reactor includes a dielectric barrier-discharge plasma reactor, in accordance with the disclosure.

Referring now to the drawings, wherein the depictions are for the purpose of illustrating certain exemplary embodiments only and not for the purpose of limiting the same, FIG. 1 schematically illustrates an embodiment of an internal combustion engine 10 and an exhaust aftertreatment system 100 that includes first and second plasma reactors 20, 40, respectively, disposed upstream to first and second catalytic reactors 30, 50, respectively. A third catalytic reactor 60 is disposed downstream of the second catalytic reactor 50, as shown. The first and second plasma reactors 20, 40 are preferably configured as dielectric barrier-discharge plasma reactors, with several embodiments described with reference to FIGS. 2, 3 and 4. The exhaust aftertreatment system 100 shown with reference to FIG. 1 illustrates one embodiment of an exhaust aftertreatment system 100 that entrains exhaust gases and provides a closed passageway for channeling an exhaust gas feedstream through one or a plurality of exhaust purification elements, with the feedstream finally being expelled into the atmosphere after being subjected to purification. The concepts described herein may apply to a plurality of embodiments of exhaust aftertreatment systems that include a plasma reactor disposed upstream of a catalytic reactor. Furthermore, various embodiments of the exhaust aftertreatment system 100 described herein may be advantageously applied to any internal combustion engine that is configured to operate at lean air/fuel ratios, including e.g., a compression-ignition engine or a lean-burn spark-ignition engine. As employed herein, the term "upstream" and related terms refer to elements that are towards an origination of a flow stream relative to an indicated location, and the term "downstream" and related terms refer to elements that are away from an origination of a flow stream relative to an indicated location.

The exhaust gas entrained by and flowing through the exhaust aftertreatment system 100 is referred to herein as an exhaust gas feedstream 15. The composition and physical and chemical characteristics of the exhaust gas feedstream 15 may change as it passes through various elements of the exhaust aftertreatment system 100, e.g., the first and second plasma reactors 20, 40 and the first, second and third catalytic reactors 30, 50, 60. As such, the exhaust gases output from the various elements of the exhaust aftertreatment system 100 are referred to herein as effluents 25, 35, 45, 55 and 65, each which may have different composition and physical and chemical characteristics as the exhaust gas feedstream progresses through the various elements of the exhaust aftertreatment system 100.

The engine 10 may be configured to operate in a four-stroke combustion cycle that includes repetitively executed intake, compression, expansion and exhaust strokes, wherein the strokes are associated with translations of pistons within cylinder bores. Operation of the engine 10 is controlled by a controller (ECM) 12, which communicates via various communication lines 14 with various sensors and various actuators to monitor and control operation of the engine 10 to generate mechanical power. The ECM 12 communicates with first and second plasma discharge controllers 22, 42, respectively, to control operation of first and second AC electric power sources 23, 43, respectively, to supply electric power to the first and second plasma reactors 20, 40, respectively. The first and second plasma reactors 20, 40 are preferably configured as dielectric barrier-discharge plasma reactors that include electrodes 24, 44, respectively, that are disposed in portions of the exhaust aftertreatment system 100, and operate as described herein. In one embodiment, the first and second plasma reactors 20, 40 are configured as groundless dielectric barrier-discharge plasma reactors. As used herein, the term "groundless" indicates absence of a discrete element or structure proximal to the electrodes 24, 44, that would be capable of electrically coupling to an electrical ground path.

The first plasma reactor 20 is disposed upstream of the first catalytic reactor 30, and both are preferably closely-coupled to the engine 10, e.g., located within an engine compartment when the engine 10 is disposed on a vehicle. The first plasma reactor 20 is disposed to receive an exhaust gas feedstream 15 that is output from the engine 10 as a byproduct of the combustion process. The first plasma reactor 20 may be attached to an engine exhaust manifold, or incorporated into the engine exhaust manifold. The first plasma reactor 20 includes an electrode 24 that is electrically connected to an AC electric power source 23, and a dielectric barrier 26 that is disposed between the electrode 24 and an electrical ground 28.

The first catalytic reactor 30 is disposed to receive the first effluent 25 that is output from the first plasma reactor 20. The first catalytic reactor 30 may be any suitable catalytic device, preferably in the form of a washcoated substrate, which may be applied to purify the first effluent 25 in the aftertreatment system 100 for the internal combustion engine 10. The first catalytic reactor 30 is preferably capable of three-way catalysis, i.e., HC and CO oxidation and NOx reduction, depending upon engine operating conditions. The first catalytic reactor 30 may also be capable of NOx storage under certain operating conditions related to temperature and air/fuel ratio. The first catalytic reactor 30 may also employ a filtering substrate that is capable of filtering particulate matter out of the exhaust gas feedstream 15 under certain operating conditions. One skilled in the art is able to design and develop an embodiment of the first catalytic reactor 30 for an embodiment of the engine 10.

The second plasma reactor 40 is disposed upstream of the second catalytic reactor 50, and both are preferably located in an underfloor location when the engine 10 and the exhaust aftertreatment 100 are disposed on a vehicle. The second plasma reactor 40 is disposed to receive the second effluent 35 that is output from the first catalytic reactor 30. The second plasma reactor 40 includes an electrode 44 that is electrically connected to the AC electric power source 43, and a dielectric barrier 46 that is disposed between the electrode 44 and the electrical ground 28. The second catalytic reactor 50 is disposed to receive the third effluent 45 that is output from the second plasma reactor 40. The second catalytic reactor 50 may be any suitable catalytic device, preferably in the form of a washcoated substrate, which may be applied to purify the third effluent 45 in the aftertreatment system 100 for the internal combustion engine 10. The second catalytic reactor 50 is preferably capable of three-way catalysis, i.e., HC and CO oxidation and NOx reduction, under various operating conditions. The second catalytic reactor 50 may employ a filtering substrate that is capable of filtering particulate matter under certain operating conditions. One skilled in the art is able to design and develop an embodiment of the second catalytic reactor 50 for an embodiment of the engine 10.

The third catalytic reactor 60 is disposed downstream of the second catalytic reactor 50, and is disposed to receive the fourth effluent 55 that is output from the second catalytic reactor 50. The third catalytic reactor 60 may be a selective catalytic reduction (SCR) device that is capable of reducing NOx molecules to elemental nitrogen in the presence of a reductant, e.g., urea or ammonia. A reductant injection device 62 is disposed to inject a reductant 64 into the fourth effluent 55 upstream of the third catalytic reactor 60. The fifth effluent 65 is expelled from the third catalytic reactor 60 into the atmosphere. SCR devices and details related to their implementation and operation are known to those skilled in the art.

Figure 2:
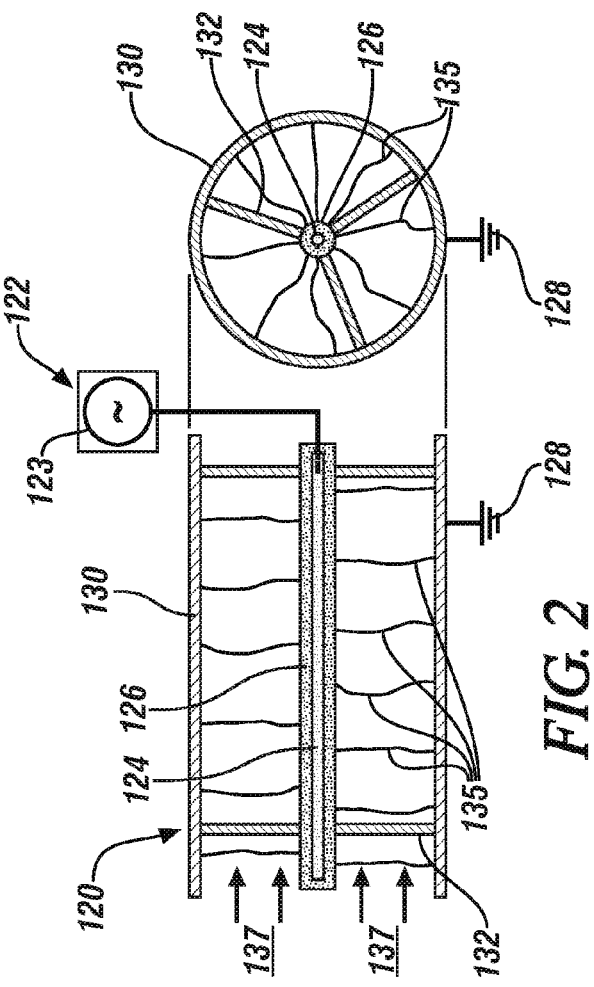
FIGS. 2, 3 and 4 schematically illustrate embodiments of a plasma reactor for an exhaust aftertreatment system that includes a dielectric barrier-discharge plasma reactor, in accordance with the disclosure.

FIG. 2 schematically shows a cross-sectional side-view and a corresponding end-view of a first embodiment of a plasma reactor 120 that may be employed in an embodiment of the exhaust aftertreatment system 100 described with reference to FIG. 1. By way of non-limiting example, the plasma reactor 120 may be either of the first or second dielectric barrier-discharge plasma reactors 20, 40 that are employed in the exhaust aftertreatment system 100 described with reference to FIG. 1. The plasma reactor 120 includes a tubular-shaped outer shell 130 that is fabricated from ferric steel or another electrically conductive material. The outer shell 130 is preferably designed with sufficient structural integrity for use in an exhaust system that may be deployed on a vehicle. The outer shell 130 preferably electrically connected to an electrical ground 128. An electrode 124 is disposed within the outer shell 130, preferably co-axial with a longitudinal axis of the outer shell 130. The electrode 124 is fabricated from ferric steel or another electrically conductive material, and is encased in a dielectric coating 126 that serves as an electrical barrier. One end of the electrode 124 is electrically connected to an AC electric power source 123, and the AC electric power source 123 is controlled by a plasma discharge controller 122. The plasma discharge controller 122 preferably communicates with the ECM 12, from which it receives operating commands. The electrode 124 may be structurally supported within the outer shell 130 with a plurality of non-conductive support beams 132 or other suitable structural elements. Operation of the plasma reactor 120 is depicted, including a plurality of streamers 135 and a direction of flow of the exhaust gas feedstream, as indicated by arrows 137.

In one embodiment, the dielectric coating 126 has a thickness that is between 1 mm and 5 mm. The dielectric coating 126 provides a dielectric barrier around the electrode 124, which is fully encapsulated thereby. The material of the dielectric coating 126 may be any suitable dielectric material capable of withstanding the temperatures and pressures that can occur in the exhaust gas feedstream 15. For example, the dielectric material may be a glass, quartz, or ceramic dielectric material, such as a high purity alumina.

The plasma discharge controller 122 controls operation of the plasma reactor 120, employing electric power supplied from an AC electric power source 123. The plasma discharge controller 122 also electrically connects to the electrical ground path 128. The AC electric power source 123 electrically connects to the electrode 124, preferably via an electrical cable, a single one of which is shown. The plasma discharge controller 122 includes control circuitry that controls the AC electric power source 123 to generate a high-frequency, high-voltage electrical pulse that is supplied to the electrode 122 to generate a plasma discharge event in response to control signals that may originate from the ECM 12. A current sensor may be disposed to monitor the electric cable to detect electrical current that is supplied from the plasma discharge controller 122 to the electrode 124 for purposes of monitoring and diagnostics. The current sensor may employ direct or indirect current sensing technologies in conjunction with signal processing circuits and algorithms to determine a parameter that is associated with the magnitude of current that is supplied to the electrode 124. Such current sensing technologies may include, by way of non-limiting embodiments, induction, resistive shunt, or Hall effect sensing technologies.

During each plasma discharge event, the plasma discharge controller 122 controls the AC electric power source 123 to generate a high-frequency, high-voltage electrical pulse that is supplied to the electrode 124. In one example, the high-frequency, high-voltage electrical pulse may have a peak primary voltage of 100 V, secondary voltages between 10 and 70 kV, a duration of 2.5 ms, and a total energy of 1.0 J, with a frequency near one megahertz (MHz). The plasma discharge event generates one or a plurality of plasma discharge streamers 135, as depicted with reference to FIG. 2, which originate at the steel shell 130 and propagate through the effluent of the exhaust gas feedstream 137 towards the electrode 124. The plasma discharge streamers 135 are low-temperature plasma streamers that may draw relatively lower currents, e.g., less than 10 mA in one embodiment. The plasma discharge streamers 135 terminate on the electrode 124. The plasma discharge streamers 135 interact with the effluent of the exhaust gas feedstream 137 to form ozone ($O_3$) from oxygen ($O_2$). The specific details of the configuration of the electrode 124, its arrangement in the exhaust gas feedstream 137 within the steel shell 130, and operating parameters (peak voltage, frequency and duration) associated with electric power and timing of activation during each plasma discharge event are application-specific, and are preferably selected to achieve desired characteristics.

Figure 3:
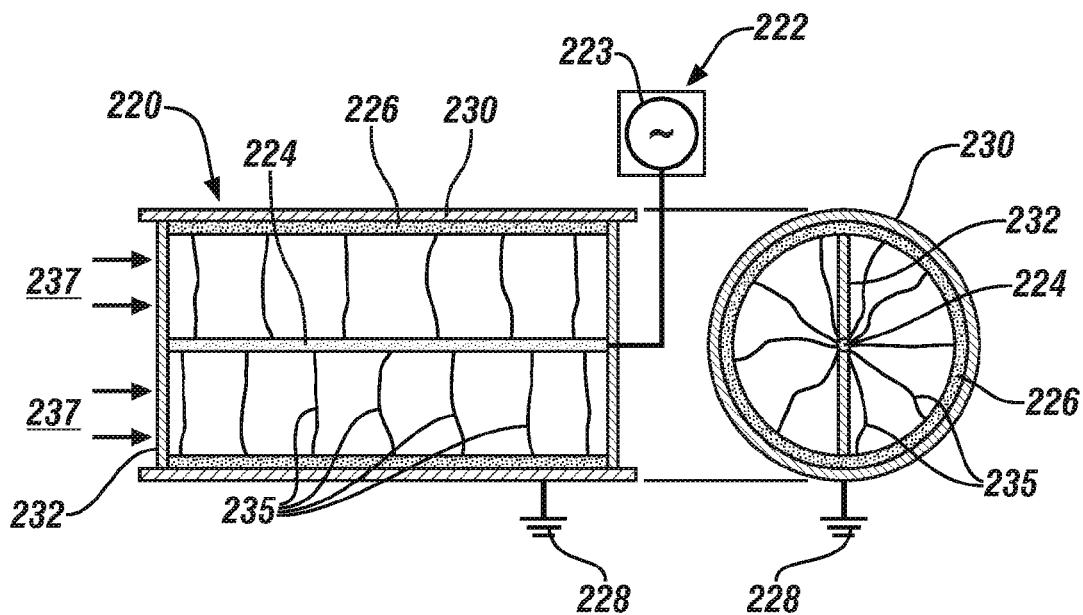

FIG. 3 schematically shows a cross-sectional side-view and a corresponding end-view of a first embodiment of a plasma reactor 220 that may be employed in an embodiment of the exhaust aftertreatment system 100. By way of non-limiting example, the plasma reactor 220 may be either of the first or second plasma reactors 20, 40 that are employed in the exhaust aftertreatment system 100 described with reference to FIG. 1. The plasma reactor 220 includes a tubular-shaped outer shell 230 that is fabricated from ferric steel or another electrically conductive material. The outer shell 230 is preferably designed with sufficient structural integrity for use in an exhaust system that may be deployed on a vehicle. The outer shell 230 preferably electrically connected to an electrical ground 228. An electrode 224 is disposed within the outer shell 230, preferably co-axial with a longitudinal axis of the outer shell 230. In this embodiment, the electrode 224 is formed as an elongated solid cylinder having a smooth outer surface. In one embodiment, the cross-sectional shape of the electrode 224 is circular. Alternatively, the cross-sectional shape of the electrode 224 may be oval, square, rectangular, five-sided, six-sided, etc. The electrode 224 is fabricated from ferric steel or another electrically conductive material. One end of the electrode 224 is electrically connected to an AC electric power source 223, and the AC electric power source 223 is controlled by a plasma discharge controller 222. The plasma discharge controller 222 preferably communicates with the ECM 12, from which it receives operating commands. The electrode 224 may be structurally supported within the outer shell 230 with a plurality of non-conductive support beams 232 or other suitable structural elements. An inner surface of the outer shell 230 is coated with a dielectric coating 226 that serves as an electrical barrier. In one embodiment, the dielectric coating 226 has a thickness that is between 2 mm and 5 mm. The dielectric coating 226 provides a dielectric barrier around the electrode 224, which is fully encapsulated thereby. The material of the dielectric coating 226 may be any suitable dielectric material capable of withstanding the temperatures and pressures that can occur in the exhaust gas feedstream 15. For example, the dielectric material may be a glass, quartz, or ceramic dielectric material, such as a high purity alumina. The plasma discharge controller 222 also electrically connects to the electrical ground path 228.

The plasma discharge controller 222 controls operation of the plasma reactor 220, employing electric power supplied from an AC electric power source 223. The AC electric power source 223 electrically connects to the electrode 224, preferably via an electrical cable, a single one of which is shown. The plasma discharge controller 222 includes control circuitry that controls the AC electric power source 223 to generate a high-frequency, high-voltage electrical pulse that is supplied to the electrode 222 to generate a plasma discharge event in response to control signals that may originate from the ECM 12. A current sensor may be disposed to monitor the electric cable to detect electrical current that is supplied from the plasma discharge controller 222 to the electrode 224 for purposes of monitoring and diagnostics.

Operation of the plasma reactor 220 is depicted, including a plurality of streamers 235 and a direction of flow of the exhaust gas feedstream 15, as indicated by arrows 237. Operation of the plasma reactor 220 during each plasma discharge event is analogous to the operation of the plasma reactor 120 that is described with reference to FIG. 2. The specific details of the configuration of the electrode 224, its arrangement in the exhaust gas feedstream 237 within the steel shell 230, and operating parameters (peak voltage, frequency and duration) associated with electric power and timing of activation during each plasma discharge event are application-specific, and are preferably selected to achieve desired characteristics.

Figure 4:
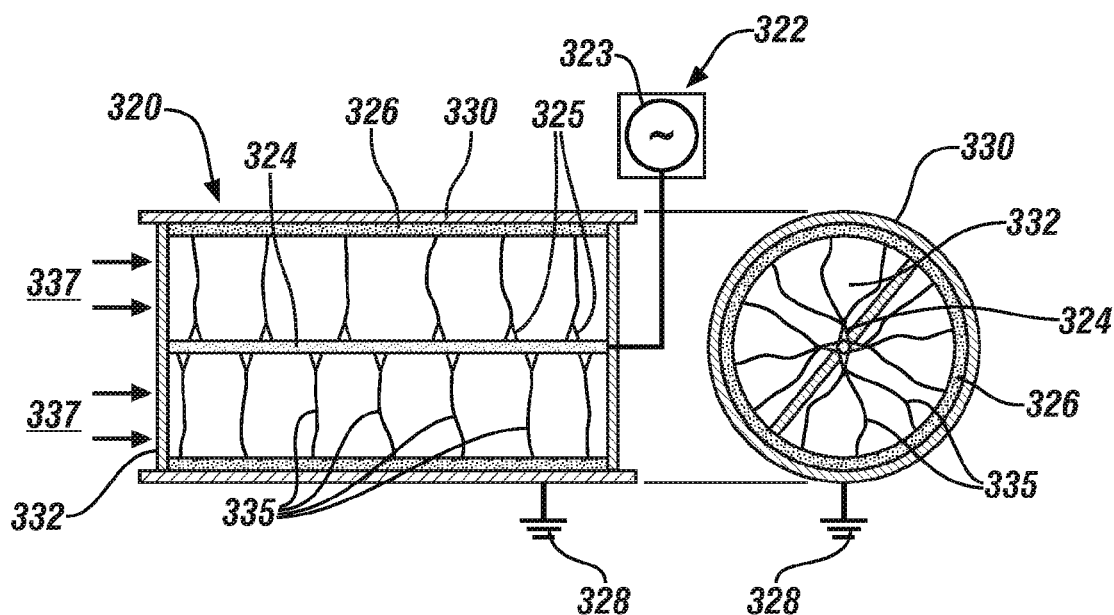

FIG. 4 schematically shows a cross-sectional side-view and a corresponding end-view of a first embodiment of a plasma reactor 320 that may be employed in an embodiment of the exhaust aftertreatment system 100. By way of non-limiting example, the plasma reactor 320 may be either of the first or second plasma reactors 20, 40 that are employed in the exhaust aftertreatment system 100 described with reference to FIG. 1. The plasma reactor 320 includes a tubular-shaped outer shell 330 that is fabricated from ferric steel or another electrically conductive material. The outer shell 330 is preferably designed with sufficient structural integrity for use in an exhaust system that may be deployed on a vehicle. The outer shell 330 preferably electrically connected to an electrical ground 328. An electrode 324 is disposed within the outer shell 330, preferably co-axial with a longitudinal axis of the outer shell 330. The electrode 324 is fabricated from ferric steel or another electrically conductive material. In this embodiment, the electrode 324 is formed as an elongated solid cylinder having an outer surface that includes a plurality of projections or prongs 325. In one embodiment, the cross-sectional shape of the electrode 324 is circular, and the prongs 325 are radially-oriented projections in the shape of inverted cones. Alternatively, the cross-sectional shape of the electrode 324 may be oval, square, rectangular, five-sided, six-sided, etc. Alternatively, the cross-sectional shape of the prongs 325 may be any suitable shape.

One end of the electrode 324 is electrically connected to an AC electric power source 323, and the AC electric power source 323 is controlled by a plasma discharge controller 322. The plasma discharge controller 322 preferably communicates with the ECM 12, from which it receives operating commands. The electrode 324 may be structurally supported within the outer shell 330 with a plurality of non-conductive support beams 332 or other suitable structural elements. An inner surface of the outer shell 330 is encased in a dielectric coating 326 that serves as an electrical barrier. In one embodiment, the dielectric coating 326 has a thickness that is between 2 mm and 5 mm. The dielectric coating 326 provides a dielectric barrier around the electrode 324, which is fully encapsulated thereby. The material of the dielectric coating 326 may be any suitable dielectric material capable of withstanding the temperatures and pressures that can occur in the exhaust gas feedstream 15. For example, the dielectric material may be a glass, quartz, or ceramic dielectric material, such as a high purity alumina. The plasma discharge controller 322 also electrically connects to the electrical ground path 328.

The plasma discharge controller 322 controls operation of the plasma reactor 320, employing electric power supplied from an AC electric power source 323. The AC electric power source 323 electrically connects to the electrode 324, preferably via an electrical cable, a single one of which is shown. The plasma discharge controller 322 includes control circuitry that controls the AC electric power source 323 to generate a high-frequency, high-voltage electrical pulse that is supplied to the electrode 322 to generate a plasma discharge event in response to control signals that may originate from the ECM 12. A current sensor may be disposed to monitor the electric cable to detect electrical current that is supplied from the plasma discharge controller 322 to the electrode 324 for purposes of monitoring and diagnostics.

Operation of the plasma reactor 320 is depicted, including a plurality of streamers 335 and a direction of flow of the exhaust gas feedstream 15, as indicated by arrows 337. Operation of the plasma reactor 320 during each plasma discharge event is analogous to the operation of the plasma reactor 120 that is described with reference to FIG. 2. The specific details of the configuration of the electrode 324, its arrangement in the exhaust gas feedstream 337 within the steel shell 330, and operating parameters (peak voltage, frequency and duration) associated with electric power and timing of activation during each plasma discharge event are application-specific, and are preferably selected to achieve desired characteristics.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be periodically executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

When a dielectric barrier-discharge plasma reactor as described herein is disposed in an exhaust aftertreatment system and contacts effluent gases that are contained in a exhaust gas feedstream from an internal combustion engine that is operating at a lean air/fuel ratio, the plasma reactor may generate ozone (O3) from constituents of the exhaust gas feedstream that include oxygen (O2). This reaction may occur under various engine operating conditions, including when the internal combustion engine is operating at a low temperature condition. The resultant ozone may react with non-methane hydrocarbon in a downstream catalytic reactor when the internal combustion engine is operating at a lean air/fuel ratio and at low temperature conditions. This process of forming ozone (O3) from oxygen (O2) in a dielectric barrier-discharge plasma reactor may be described as follows:

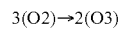

3(O2)→2(O3)

The formed ozone may oxidize unburned hydrocarbons (UHC) in the downstream catalytic reactor, as follows:

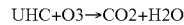

UHC+O3→CO2+H2O

Furthermore, the formed ozone may oxidize carbon monoxide (CO) in the downstream catalytic reactor when the internal combustion engine is operating at the lean air/fuel ratio and at the low temperature condition, as follows:

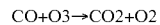

CO+O3→CO2+O2

Furthermore, the formed ozone may oxidize carbon monoxide (CO) in the downstream catalytic reactor when the internal combustion engine is operating at a rich air/fuel ratio, with a potential to promote CO oxidation under rich conditions such as may occur during ammonia generation when the downstream catalytic reactor is a selective catalytic reactor device (SCR), or may occur during regeneration when the downstream catalytic reactor is capable of NOx storage, often referred to as a lean NOx trap device.

Furthermore, the dielectric barrier-discharge plasma reactor may oxidize nitrogen oxide (NO) contained in the exhaust gas feedstream to form nitrogen dioxide (NO2), which may react with trapped particulate matter to form elemental nitrogen (N2) and carbon dioxide (CO2) in a downstream catalytic reactor when the internal combustion engine is operating at a rich air/fuel ratio and at temperature conditions within a range between 200 C and 350 C, as may be related to execution of a particulate filter regeneration routine. The various reactions may be described as follows. Ozone (O3) may be formed from oxygen (O2) in the dielectric barrier-discharge plasma reactor as follows:

$$3(O2) \rightarrow 2(O3)$$

The formed ozone may be used to convert NO to NO2 in a gas-phase reaction, as follows:

$$NO + O3 \rightarrow NO2 + O2$$

The presence of NO2 assists in soot oxidation at temperatures within a range between 200 C and 350 C, as follows:

$$NO2 + C \rightarrow 0.5 N2 + CO2$$

$$NO2 + C \rightarrow NO + CO$$

A higher concentration of NO2, e.g., at a ratio of NO2:NO that is greater than 1:1, may facilitate faster regeneration rates in the particulate filter.

Referring again to FIG. 1, a higher concentration of NO2, e.g., at a ratio of NO2:NO that is greater than 1:1 out of the second plasma reactor 40 may facilitate faster reaction rates in the downstream third catalytic reactor 60 of the exhaust aftertreatment system 100. When either the second plasma reactor 40 or the third catalytic reactor 60 includes a particulate filter, when the ratio of nitrogen dioxide and nitric oxide is greater than 1:1, it reacts to oxidize soot that is stored on the particulate filter.

As such, an embodiment of the dielectric barrier-discharge plasma reactor described herein may enhance low temperature lean non-methane hydrocarbon and CO oxidation on a three-way catalyst, and may generate NO2 to facilitate soot oxidation on a particulate filter. Thus, on exhaust aftertreatment systems that have particulate filter devices that employ platinum to promote NO to NO2 oxidation, the employment of the plasma reactor to oxidize nitrogen oxide (NO) contained in the exhaust gas feedstream to form nitrogen dioxide (NO2) may reduce a need for platinum in the particulate filter. Furthermore, embodiments of the dielectric barrier-discharge plasma reactor that is disposed upstream of a catalytic reactor may be employed to control a NO:NO2 ratio to less than 0.5 to eliminate or mitigate sulfur poisoning on the downstream catalytic reactor. Furthermore, the dielectric barrier-discharge plasma reactor may eliminate a need for a catalytic device having a capacity to store NO2. Furthermore, the dielectric barrier-discharge plasma reactor is not constrained to a close-coupled location on a vehicle. One embodiment of the exhaust aftertreatment system may include a single one of the dielectric barrier-discharge plasma reactors disposed at a position that is distal to the internal combustion engine, e.g., in an underfloor location.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An exhaust aftertreatment system for purifying an exhaust gas feedstream expelled from an internal combustion engine that is operable at an air/fuel ratio that is lean of stoichiometry, comprising:
   a barrier discharge plasma reactor disposed upstream relative to a catalytic reactor and electrically connected to a plasma controller;
   wherein the catalytic reactor comprises a selective catalytic reactor device downstream relative to a reductant injection device, and wherein the barrier discharge plasma reactor is controlled to generate ozone from constituents of the exhaust gas feedstream and wherein the generated ozone reacts, in the plasma reactor, to oxidize nitrogen oxide (NO) contained in the exhaust gas feedstream to form nitrogen dioxide (NO2); and wherein the NO2 reacts in the selective catalytic reactor device with reductant to form elemental nitrogen (N2) and carbon dioxide;
   wherein the barrier discharge plasma reactor is controlled to generate ozone from constituents of the exhaust gas feedstream when the internal combustion engine is operating at a lean air/fuel ratio and at a low temperature condition; and
   wherein the generated ozone reacts, in the catalytic reactor, to oxidize non-methane hydrocarbons contained in the exhaust gas feedstream when the internal combustion engine is operating at the lean air/fuel ratio and at the low temperature condition.

2. The exhaust aftertreatment system of claim 1, further comprising wherein the generated ozone reacts, in the catalytic reactor, to oxidize carbon monoxide contained in the exhaust gas feedstream when the internal combustion engine is operating at the lean air/fuel ratio and at the low temperature condition.

3. The exhaust aftertreatment system of claim 1, wherein the generated ozone reacts, in the plasma reactor, to oxidize nitrogen oxide contained in the exhaust gas feedstream to form nitrogen dioxide; and wherein the nitrogen dioxide reacts with carbon in the catalytic reactor to form elemental nitrogen and carbon dioxide when the internal combustion engine is operating at a lean air/fuel ratio and at temperature conditions within a range between 200C and 350C.

4. The exhaust aftertreatment system of claim 1, wherein the generated ozone reacts, in the plasma reactor, to oxidize nitrogen oxide (NO) contained in the exhaust gas feedstream to form nitrogen dioxide (NO2) at a ratio of NO2:NO that is greater than 1:1.

5. The exhaust aftertreatment system of claim 1, wherein the barrier discharge plasma reactor includes an electrode disposed in the exhaust gas feedstream and electrically connected to an AC electric power source and a dielectric barrier disposed between the electrode and an outer shell that is electrically connected to an electrical ground.

6. The exhaust aftertreatment system of claim 4, wherein the electrode is encapsulated in the dielectric material.

7. The exhaust aftertreatment system of claim 4, wherein the dielectric material is coated on an inner surface of the outer shell.

8. The exhaust aftertreatment system of claim 4, wherein the electrode comprises an elongated solid cylinder fabricated from electrically conductive material and longitudinally disposed in the exhaust gas feedstream within the outer shell.

9. The exhaust aftertreatment system of claim 8, wherein the elongated solid cylinder of the electrode has a smooth outer surface.

10. The exhaust aftertreatment system of claim 8, wherein the elongated solid cylinder of the electrode has a plurality of radially-oriented prongs.

11. The exhaust aftertreatment system of claim 1, wherein the plasma controller controllably supplies AC electric power to the barrier discharge plasma reactor at a voltage level between 5 and 50 kV and at a frequency between 60 Hz and 10 MHz.

12. A system for purifying exhaust gas that is expelled from an internal combustion engine that is operating lean of stoichiometry, comprising:
 a first plasma reactor disposed upstream relative to a first catalytic reactor;
 a second plasma reactor disposed downstream relative to the first catalytic reactor and upstream relative to a second catalytic reactor;
 a selective catalytic reactor disposed downstream relative to the second catalytic reactor;
 wherein the first and second plasma reactors each include a plasma controller electrically connected to a barrier discharge plasma igniter, wherein each barrier discharge plasma igniter includes an electrode encapsulated in a dielectric material and disposed in the exhaust gas feedstream, and an electrical ground.

13. The system of claim 12, wherein the plasma controller controllably supplies AC electric power to the barrier discharge plasma reactor at a voltage level between 5 and 50 kV and at a frequency between 60 Hz and 10 MHz.

14. The system of claim 12, wherein the barrier discharge plasma reactor is controlled to generate ozone from constituents of the exhaust gas feedstream, wherein the generated ozone reacts, in the plasma reactor, to oxidize nitrogen oxide contained in the exhaust gas feedstream to form nitrogen dioxide; and wherein the nitrogen dioxide reacts in the selective catalytic reactor device with reductant to form elemental nitrogen and carbon dioxide.

15. The system of claim 12, wherein the generated ozone reacts, in the plasma reactor, to oxidize nitrogen oxide contained in the exhaust gas feedstream to form nitrogen dioxide; and wherein the nitrogen dioxide reacts with carbon in the catalytic reactor to form elemental nitrogen and carbon dioxide when the internal combustion engine is operating at a lean air/fuel ratio and at temperature conditions within a range between 200C and 350C.

16. The system of claim 12, wherein the generated ozone reacts, in the plasma reactor, to oxidize nitrogen oxide (NO) contained in the exhaust gas feedstream to form nitrogen dioxide (NO2) at a ratio of NO2:NO that is greater than 1:1.

17. A method for purifying an exhaust gas feedstream expelled from an internal combustion engine that is operating at lean air/fuel ratio, wherein the internal combustion engine is fluidly connected to an exhaust aftertreatment system including a barrier discharge plasma reactor disposed upstream relative to a selective catalytic reactor device, and a particulate filter, the method comprising:
 operating, via a plasma controller, the barrier discharge plasma reactor when the internal combustion engine is operating at a lean air/fuel ratio and at a low temperature condition to generate ozone from constituents of the exhaust gas feedstream; and
 employing the generated ozone in the selective catalytic reactor device to oxidize non-methane hydrocarbons contained in the exhaust gas feedstream;
 wherein the selective catalytic reactor device is located downstream relative to a reductant injection device, and wherein the barrier discharge plasma reactor is controlled to generate ozone from constituents of the exhaust gas feedstream and wherein the generated ozone reacts, in the plasma reactor, to oxidize nitrogen oxide (NO) contained in the exhaust gas feedstream to form nitrogen dioxide (NO2); and wherein the NO2 reacts in the selective catalytic reactor device with reductant to form elemental nitrogen (N2) and carbon dioxide.

18. The method of claim 17, wherein controlling the barrier discharge plasma reactor comprises supplying AC electric power to the barrier discharge plasma reactor at a voltage level between 5 and 50 kV and at a frequency between 60 Hz and 10 MHz.

19. The method of claim 17, wherein the ozone reacts to oxidize nitrogen oxide contained in the exhaust gas feedstream to form a ratio of nitrogen dioxide and nitric oxide that is greater than 1:1; and
 wherein the ratio of nitrogen dioxide and nitric oxide that is greater than 1:1 reacts to oxidize soot that is stored on the particulate filter.

* * * * *